(12) United States Patent  
Sakurai

(10) Patent No.: US 7,760,403 B2  
(45) Date of Patent: Jul. 20, 2010

(54) OPTICAL IRRADIATION APPARATUS, IMAGE READING APPARATUS USING THE SAME, AND IMAGE FORMING APPARATUS USING THE SAME

(75) Inventor: Yasuo Sakurai, Yokohama (JP)

(73) Assignee: Ricoh Co., Ltd., Tokyo (JP)

( * ) Notice: Subject to any disclaimer, the term of this patent is extended or adjusted under 35 U.S.C. 154(b) by 1057 days.

(21) Appl. No.: 11/452,217

(22) Filed: Jun. 14, 2006

(65) Prior Publication Data

US 2006/0279961 A1 Dec. 14, 2006

(30) Foreign Application Priority Data

Jun. 14, 2005 (JP) ............................. 2005-173445  
Jun. 14, 2005 (JP) ............................. 2005-173453

(51) Int. Cl.  
*G02B 6/00* (2006.01)  
*F21V 7/04* (2006.01)  
*H04N 1/04* (2006.01)

(52) U.S. Cl. ...................... 358/484; 362/610; 362/551; 358/475

(58) Field of Classification Search ................ 358/507, 358/510, 511, 475, 481, 482, 484, 480; 362/606, 362/609, 610, 611, 612, 613, 615, 620, 551, 362/559, 84; 359/227; 349/57, 62  
See application file for complete search history.

(56) References Cited

U.S. PATENT DOCUMENTS

| | | | |
|---|---|---|---|
| 4,638,987 | A | 1/1987 | Sakurai |
| 4,715,597 | A | 12/1987 | Sakurai |
| 6,307,648 | B1 | 10/2001 | Matsumoto |
| 6,480,297 | B1* | 11/2002 | Suzuki et al. ............. 358/1.16 |
| 7,253,799 | B2* | 8/2007 | Lee et al. .................... 345/102 |
| 7,275,853 | B2* | 10/2007 | Kano et al. ................. 362/620 |
| 7,430,358 | B2* | 9/2008 | Qi et al. ..................... 385/146 |
| 7,455,441 | B2* | 11/2008 | Chose et al. ............... 362/608 |
| 7,484,873 | B2* | 2/2009 | Dejima et al. ............. 362/606 |
| 7,484,874 | B2* | 2/2009 | Lee et al. ................... 362/607 |
| 7,522,810 | B2* | 4/2009 | Ogura et al. ............... 385/146 |
| 7,537,372 | B2* | 5/2009 | Sugimoto et al. .......... 362/619 |
| 7,556,391 | B2* | 7/2009 | Matsushita ................. 362/29 |
| 7,564,517 | B2* | 7/2009 | Daiku et al. ................ 349/62 |

(Continued)

FOREIGN PATENT DOCUMENTS

CN 1604346 4/2005

(Continued)

*Primary Examiner*—Jerome Grant, II  
(74) *Attorney, Agent, or Firm*—Oblon, Spivak, McClelland, Maier & Neustadt, L.L.P.

(57) ABSTRACT

A novel optical irradiation apparatus includes a light source and a light guide. The light source is configured to radially irradiate a light beam. The light guide is configured to include a transparent material configured to lead the light beam irradiated from the light source in a specific direction and to emit the light beam. The light guide also includes an incidence plane, an exit plane, and plural connecting planes. The incidence plane is configured to receive the light beam. The exit plane is configured to emit the light beam to so as to irradiate an object. The plural connecting planes are configured to connect the incidence plane to the exit plane. A part of at least one of the plural connecting planes is inclined with respect to an axis of the light beam.

30 Claims, 9 Drawing Sheets

U.S. PATENT DOCUMENTS

| | | |
|---|---|---|
| 2003/0179420 A1 | 9/2003 | Fujino |
| 2004/0190280 A1* | 9/2004 | Matsushita .................. 362/31 |
| 2004/0212672 A1* | 10/2004 | Satoh et al. ................. 347/234 |
| 2004/0257795 A1 | 12/2004 | Yamamoto et al. |
| 2005/0030730 A1* | 2/2005 | Ohkawa et al. .............. 362/31 |
| 2005/0088705 A1 | 4/2005 | Okamoto et al. |
| 2005/0088707 A1 | 4/2005 | Sakurai et al. |
| 2005/0129436 A1 | 6/2005 | Kohchi et al. |
| 2005/0141244 A1* | 6/2005 | Hamada et al. ............ 362/612 |
| 2005/0180719 A1* | 8/2005 | Hara et al. .................. 385/146 |
| 2006/0008295 A1 | 1/2006 | Kohchi et al. |
| 2006/0109681 A1* | 5/2006 | Kim et al. ................... 362/606 |
| 2006/0187500 A1* | 8/2006 | Sakurai ...................... 358/474 |
| 2006/0239030 A1* | 10/2006 | Chen ........................... 362/606 |
| 2006/0268581 A1* | 11/2006 | Hsu ............................. 362/633 |
| 2006/0274551 A1* | 12/2006 | Takada ........................ 362/611 |
| 2007/0165422 A1* | 7/2007 | Iwasaki ....................... 362/615 |
| 2007/0253218 A1* | 11/2007 | Tanabe ........................ 362/612 |
| 2009/0080216 A1* | 3/2009 | Tanabe ........................ 362/612 |

FOREIGN PATENT DOCUMENTS

| | | |
|---|---|---|
| EP | 1 158 761 A1 | 11/2001 |
| EP | 1 511 289 A1 | 3/2005 |
| EP | 1 615 418 A1 | 1/2006 |
| JP | 60-230624 | 11/1985 |
| JP | 3-219761 | 9/1991 |
| JP | 4-18771 | 1/1992 |
| JP | 5-46169 | 6/1993 |
| JP | 6-225081 | 8/1994 |
| JP | 10-190959 | 7/1998 |
| JP | 11-55464 | 2/1999 |
| JP | 11-75015 | 3/1999 |
| JP | 11-177738 | 7/1999 |
| JP | 11-232912 | 8/1999 |
| JP | 2000-22892 | 1/2000 |
| JP | 2000-48616 | 2/2000 |
| JP | 2001-119530 | 4/2001 |
| JP | 3187280 | 5/2001 |
| JP | 3392117 | 1/2003 |
| JP | 2005-11549 | 1/2005 |
| JP | 3659770 | 3/2005 |
| JP | 2005-123675 | 5/2005 |

* cited by examiner

OPTICAL IRRADIATION APPARATUS, IMAGE READING APPARATUS USING THE SAME, AND IMAGE FORMING APPARATUS USING THE SAME

BACKGROUND OF THE INVENTION

1. Field of the Invention

The present invention relates to an optical irradiation apparatus, an image reading apparatus, and an image forming apparatus. More particularly, the present invention relates to an apparatus having a light guide which is made of a transparent material and is capable of causing light that enters the light guide from a light source to exit the light guide in a specific direction.

2. Discussion of the Background

A conventional optical irradiation apparatus is used as an optical irradiator that irradiates a manuscript in an image reading apparatus, such that a reflecting image of the manuscript is read by using, for example, a photo acceptance element such as a charge coupled devices (CCD), a complementary metal oxide semiconductor (CMOS), etc. In a case an image reading apparatus reads a color image, light reflecting from the manuscript is generally received by individual photo acceptance elements in colors of red (R), green (G), and blue (B). FIG. 1A illustrates light reflecting from the manuscript to the CCD. The figure includes a manuscript M, a first mirror 19, a second mirror 20, a third mirror 21, an image formation lens 16, and a CCD 17. As shown in FIG. 1A, each photo acceptance element corresponding to each color is arranged so that the positions may differ from each other. Therefore, the received light on each photo acceptance element includes the light reflected from various points of the manuscript. Then, in a direction (i.e., a horizontal direction in FIG. 1A) of the manuscript corresponding to a direction of a row of the photo acceptance elements, it is necessary to improve the quality of reading the image that the intensity of the light be evenly irradiated from the optical irradiation apparatus. Specifically, w and b are defined as shown in FIG. 1B, where w is a width of each photo acceptance element (in the direction of a row of photo acceptance elements), and b is a distance between the center of the photo acceptance element. p, as used below, is a reduction ratio by the optical system from the manuscript to each photo acceptance element. A width X on the manuscript, which needs to be irradiated with evenly intense light (in the horizontal direction in FIG. 1B), is set to (w+bx2+v)/p. "v" is a parameter suitably set in consideration of errors, such as a manufacture error.

In order to irradiate a width X of the manuscript with evenly intense light, for example, an apparatus using a cylinder type xenon lamp as a light source which is arranged so that its longitudinal direction may intersect perpendicularly to the direction of the width X is used as the optical irradiation apparatus. However, in recent years, there has been a demand to save energy and increase the reliability of the image reading apparatus. The xenon lamp consumes a lot of power and the calorific value is great. Therefore, a light source with smaller power consumption and calorific value than the xenon lamp is desired. As such, for example, a light emitting diode (LED) may be used as the light source. However, compared with the xenon lamp, the optical irradiation intensity of the LED is generally small. Therefore, if the LED is simply used as the light source, it is difficult to irradiate light with a sufficient intensity in the width X on the above-mentioned manuscript.

The conventional optical irradiation apparatus, which has a transparent light guide between a light source and a manuscript, is known. The light guide leads the light from the LED toward the manuscript. If the optical irradiation apparatus equipped with such a light guide is used, it becomes possible to concentrate the radial light from the LED to the narrow domain of the width X on the above-mentioned manuscript. Therefore, if the light guide is used, even if the LED that has a small irradiation intensity etc. is used as the light source, it becomes possible to irradiate light with large intensity at the portion of the width X.

If the LED which irradiates light radially is used as light source, in order to concentrate the light in the portion (irradiation target domain) of the width X on the manuscript for intensifying the light in the target domain, it is important to lead the incident light with the light guide as much as possible to the exit plane of the light guide. In order to realize this, it is necessary to prevent the incident light from exiting the light guide before the light reaches the exit plane.

FIG. 2 illustrates incident light entering the light guide. This figure is seen from the direction which intersects perpendicularly to the width X on the above-mentioned manuscript shown in FIG. 1A.

Although a part of the incident light, which entered from an incidence plane 431a of a light guide 431, may pass through the light guide to an exit plane 431b, much of the light reaches a connecting plane 431c first. According to incidence angles (angle with the normal line of the connecting plane 431c) θ1 and θ2 to the connecting plane 431c, a part of the light penetrates the connecting plane 431c. For example, an incidence light L1 does not penetrate the connecting plane 431c. The connecting plane 431c reflects the light as L1', and a part of an incident light L2 penetrates the connecting plane 431c as L2'. In detail, the incident light L2 with the incidence angle θ2 smaller than a critical angle α to the connecting plane 431c penetrates and exits through the connecting plane 431c to the outside as L2', and the incidence light L1 with the incidence angle θ1, which is equal to or larger than the critical angle α, to the connecting plane 431c reflects on the connecting plane 431c as L1' and finally exits from the exit plane 431b.

FIG. 3 shows a conventional optical irradiation apparatus capable of preventing the incident light from exiting from the light guide before the light reaches the exit plane of the light guide.

In the conventional optical irradiation apparatus, as shown in FIG. 3, which has an LED 32 as light source and an incidence plane 531a of a light guide 531 that is formed in a convex shape so that it makes the incidence angle to a connecting plane 531c greater than the incidence angle when compared to when the incidence plane is flat. This conventional optical irradiation apparatus prevents the incident light from the incidence plane 531a from passing through the connecting plane 531c to the outside, by reflecting the light incident on the connecting plane 531c. If the incidence plane is flat, the incidence angle to the connecting plane 531c is smaller than the critical angle, so that the light may penetrate the connecting plane 531c to the outside of the light guide.

Further, in the above-mentioned conventional optical irradiation apparatus, a reflective part 533 is formed by vapor-depositing aluminum on the external surface of the connecting plane 531c. The incident light which pass through the connecting plane 531c to outside, even if the incidence plane 531a is formed in the shape of convex, t may be returned to the inside of the light guide because the light reflects on the reflective part 533.

Thus, in the above-mentioned conventional optical irradiation equipment, by forming the incidence plane 531a of the light guide 531 in a convex shape, and forming the reflective part 533 on the external surface of the connecting plane 531c, the conventional optical irradiation equipment prevents the incident light from passing through the incidence plane 531a and exiting to the outside of the light guide before the light reaches the exit plane of the light guide.

However, since it is difficult to manufacture the incidence plane 531a of the light guide 531 in a convex shape compared to a flat incidence plane, the manufacturing costs of the convex shaped incidence plane are high. In addition, if the reflective part 533 is formed on the external surface of the connecting plane 531c, additional costs are incurred for the reflective material, and process affixing the reflective part 533 to the external surface of the connecting plane 531c. Therefore, the manufacturing costs of the conventional irradiation apparatus are high. Thus, in the above-mentioned conventional optical irradiation apparatus, although it may prevent the incident light from exiting through the incidence plane 531a to the outside of the light guide before the light reaches the exit plane of the light guide, there is a problem that the manufacturing cost is high.

SUMMARY OF THE INVENTION

Non-limiting embodiments of a novel optical irradiation apparatus which can effectively lead an incidence light irradiated from the light source to a specific direction is described herein.

In one example, a novel optical irradiation apparatus includes a light source and a light guide. The light source is configured to radially irradiate a light beam. The light guide is configured to include a transparent material configured to lead the light beam irradiated from the light source in a specific direction and to emit the light beam. The light guide also includes an incidence plane, an exit plane, and plural connecting planes. The incidence plane is configured to receive the light beam. The exit plane is configured to emit the light beam to so as to irradiate an object. The plural connecting planes are configured to connect the incidence plane to the exit plane. A part of at least one of the plural connecting planes is inclined with respect to an axis of the light beam.

In another example, a novel optical irradiation apparatus includes a light source and a light guide. The light source is configured to radially irradiate a light beam. The light guide is configured to include a transparent material configured to lead the light beam irradiated from the light source in a specific direction and to emit the light beam. The light source and the light guide are provided on a single positioning member.

BRIEF DESCRIPTION OF THE DRAWINGS

A more complete appreciation of the non-limiting embodiments described in the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 4:
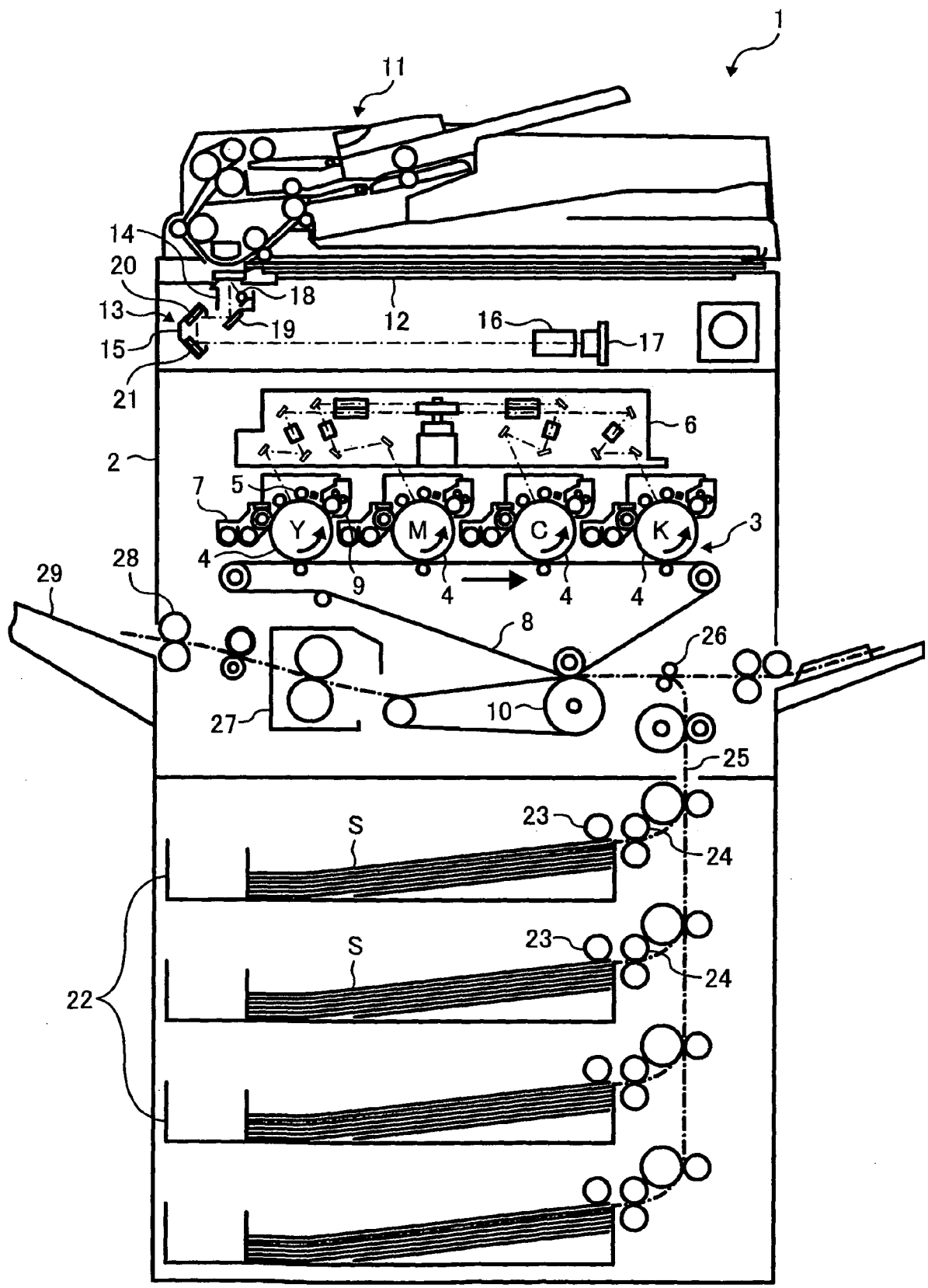
FIG. 4 is an exemplary configuration of a full color copying apparatus in accordance with an exemplary embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, FIG. 4 is an elevational view showing an outline of an internal structure of a full color copying machine 1 which is an exemplary image forming apparatus to which this invention is applied.

Although the color copying machine is mentioned as an example, the present invention is equally applicable when applied to a black and white copying machine. A printer engine 3 for forming a color image is provided in the central part of a main part 2 of copying machine 1. This printer engine 3 is equipped with four drum shaped photo conductors 4 which are arranged at equal intervals and provided in parallel. The printer engine 3 is equipped with four electrification rollers 5 to uniformly charge in the perimeter side of each photo conductor 4, respectively. The printer engine 3 is equipped with the exposure device 6 which forms an electrostatic latent image in the perimeter side of each photo conductor 4 by exposing the perimeter side of each photo conductor 4 charged with each electrification roller 5, respectively, according to the corresponding image data. In addition, the printer engine 3 includes four developers 7, a middle transfer belt 8, four cleaning devices 9, and a transfer roller 10. The developers 7 develop from electrostatic latent image to a toner image by supplying toner to the electrostatic latent image on the perimeter side of each photo conductor 4. The toner image is transferred to the middle transfer belt 8 from each photo conductor 4. The cleaning device removes the remaining toner on each photo conductor 4 after the toner is transferred to the middle transfer belt 8. The transfer roller 10 transfers the toner image on the middle transfer belt 8 to a recording paper S. On the four photo conductors 4, the toner image of different colors (Y; yellow, M; magenta, C; cyan, K; black), respectively is formed, by being transferred one by one so that the toner images of each of these colors may overlap mutually on the middle transfer belt 8. Then, a toner image of color is formed on the middle transfer belt 8. Finally, the color toner image is formed on the recording paper S.

A scanner, as an image reading part, reads the image of a manuscript side that is provided on the upper part of the main part 2 of the apparatus. The scanner includes an automatic document feeder (ADF) 11, a contact glass 12, and an image read mechanism 13 as an image reading unit. The ADF 11 automatically conveys the manuscript D to which the light is illuminated with the optical irradiation equipment mentioned later. The manuscript D is put on the contact glass 12. The image read mechanism 13 reads the image of the manuscript D on the contact glass 12.

The image read mechanism 13 includes a first running unit 14, a second running unit 15, an image formation lens 16, and a CCD 17 which is a photoelectric conversion element as a photo acceptant element. The first running unit 14 and the second running unit 15 run at the speed rate of 2:1 in parallel with the contact glass 12. An optical irradiation unit 18 and a first mirror 19 are provided in the first running unit 14. The manuscript D which is put or conveyed by the ADF 11 on to the contact glass 12 is illuminated from the lower part of contact glass 12 by the optical irradiation unit 18. The first mirror 19 reflects the reflected light from the manuscript to the CCD 17. The second running unit 15 includes a second mirror 20 and a third mirror 21 which reflect the reflected light from the first mirror 19. The reflected light through the first mirror 19, the second mirror 20, the third mirror 21 and the image formation lens 16 is accepted on the CCD 17.

In the lower part of the main part 2 of the machine, paper cassettes 22 are provided which contain the recording paper S. A pickup roller 23 and a feed roller 24 separate and feed the recording paper S one by one. And the recording paper S is conveyed along paper conveyance way 25 prepared in the main part 2 of the machine. Along the paper conveyance way 25, a resist roller 26, a transfer roller 10, a fixing unit 27, and a delivery roller 28 are arranged. The resist roller 26 is driven so that the recording paper is held temporarily and conveyed to a second transferring region at a same time with the toner image that come into the second transferring region between the middle transfer belt 8 and the transfer roller 10. After the second transferring, the recording paper S is conveyed to the fixing unit 27, and the toner is melted and fixed on the recording paper S with heat and pressure by the fixing unit 27. After fixing, the recording paper S is delivered on a paper output tray 29 by the delivery roller 28.

Figure 5:
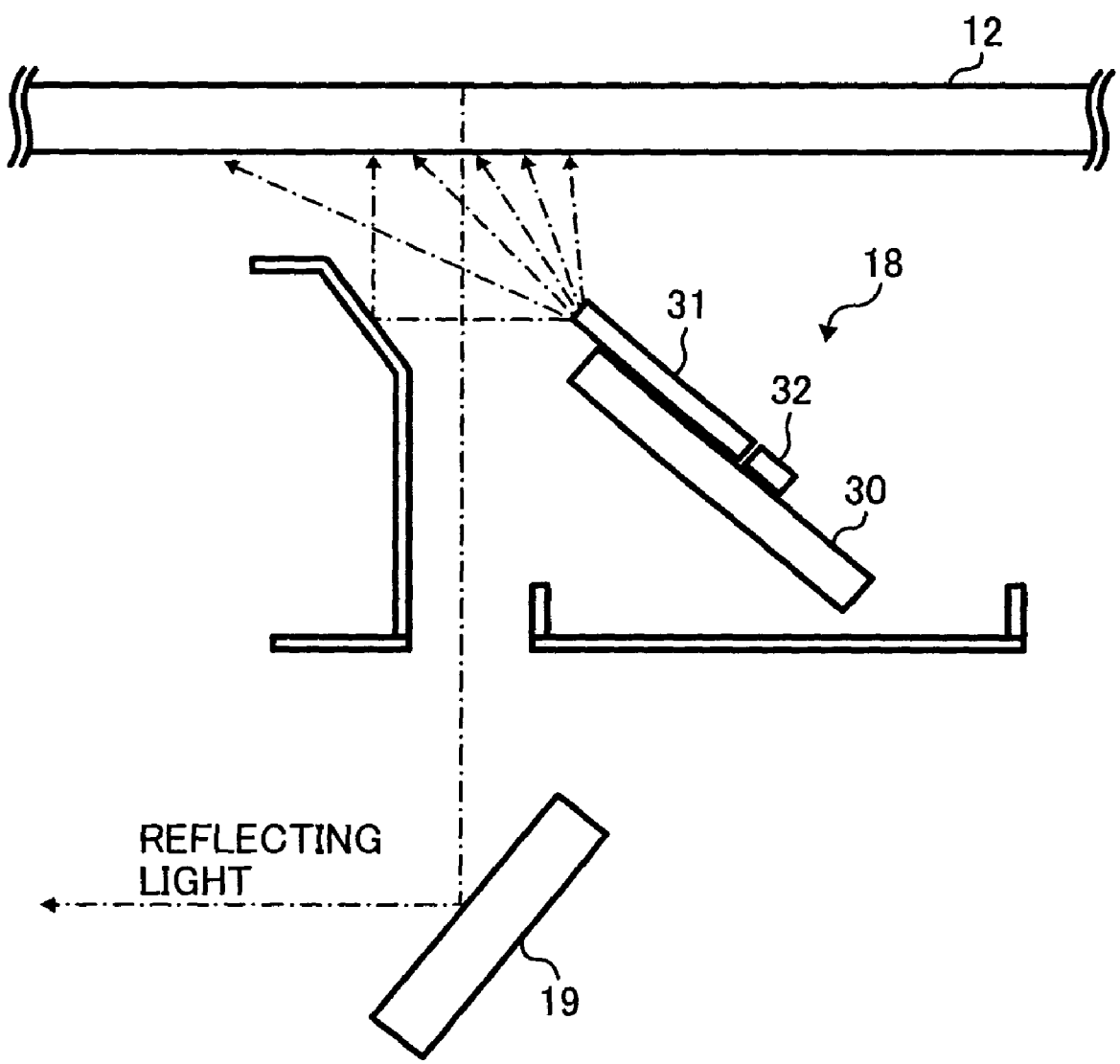
FIG. 5 is illustrates a general configuration of an optical irradiation unit which is seen from a horizontal direction included in the full color copying apparatus of FIG. 4.

Next, configuration of the optical irradiation unit 18 of the above-mentioned image reading part is explained. FIG. 5 is an illustration showing a general configuration of the optical irradiation unit 18 which is seen from about the horizontal direction that intersects perpendicularly to the running direction of the 1st running unit 14.

Figure 6A:
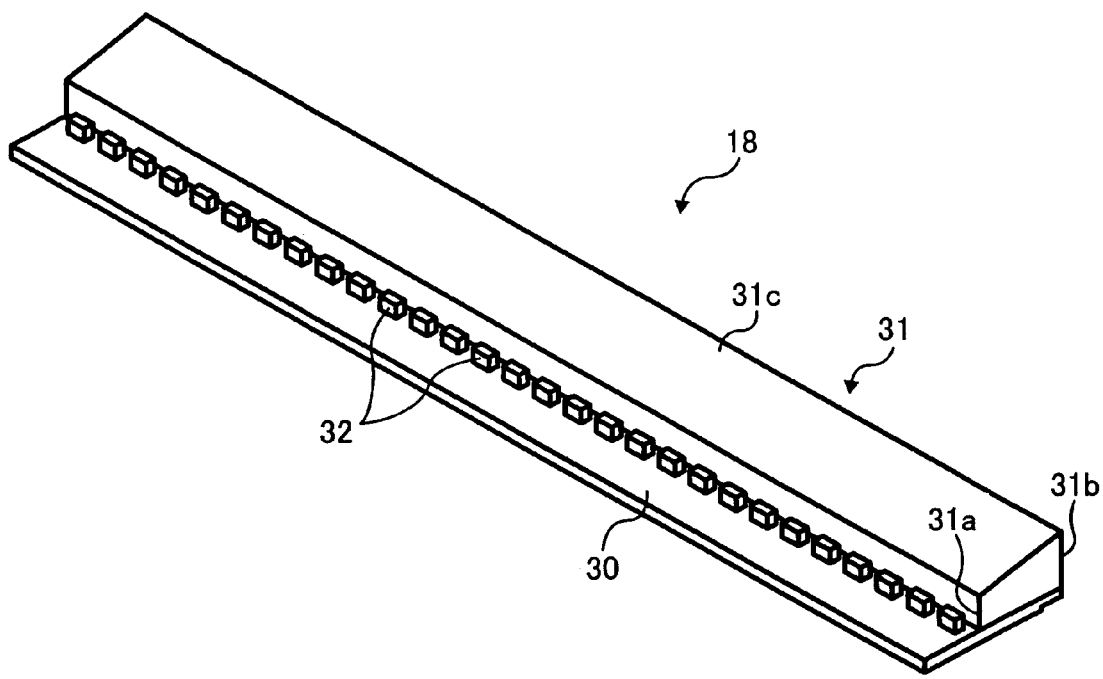
FIG. 6A is a perspective illustration of the optical irradiation unit for an exemplary embodiment.

FIG. 6A is a perspective illustration of the above-mentioned optical irradiation unit 18. As shown in FIG. 6A, the optical irradiation unit 18 in this embodiment has plural LEDs 32, which are the light sources arranged at one sequence on an LED array board 30 which is a circuit board, and a light guide 31. The LED array board 30 is arranged so that its longitudinal direction, which intersects perpendicularly to the running direction of the first running unit 14, extends to the main scanning direction of the manuscript D. The LEDs 32 are arranged along the longitudinal direction of the LED array board 30. A circuit pattern and the various circuit elements for supplying electric power to LEDs 3, which are not illustrated, are formed in the LED array board 30. The LEDs 32, in this embodiment, are arranged on the LED array board 30 so that the exit side may face and be parallel to the substrate side of the LED array board 30. Therefore, the direction of a central line of the light which exits from the exit side of the LEDs 32 is almost in parallel with the substrate side of the LED array board 30. In addition, although the LEDs 32 are arranged in one sequence in this embodiment, other embodiments may arrange the LEDs in two or more sequences.

The light guide 31 is made of a translucent material which has optical permeability, for example, transparent resin (acrylics, polycarbonate, etc.), glass, etc. The light guide 31 is a hexahedron object which has incidence plane 31a of the long shape of a rectangle, at least longer than the length of one or more sequences of LEDs 32, and an exit plane 31b. The light guide 31 is arranged between each LED 32 and the manuscript. Specifically, the light guide 31 is arranged so that the incidence plane 31a may face each exit plane of LED 32, and the incidence plane 31a may be near or in contact with the exit plane of LED 32. The light guide 31 is also arranged so that the exit plane 31b may face the manuscript. Then, the light guide 31 accepts the light irradiated from LED 32 through its incidence plane 31a, guides and outputs the light to the manuscript from the exit plane 31b. In this embodiment, the light guide 31 is attached with, for example, adhesives, double-stick tape, etc. to the substrate side of the LED array board 30 in which plural LEDs 32 are attached.

The two connecting planes at the edge of longitudinal direction of the light guide 31, between the planes of 31a and 31b, are vertical to the connecting plane on the substrate side of the LED array board 30. On the other hand, a normal line of a connecting plane 31c which faces the connecting plane attached on the substrate is not vertical to the substrate side of the LED array board 30. In detail, the distance between the connecting plane 31c and the connecting plane on the substrate may enlarge toward the exit plane 31b from the incidence plane 31a. Then, a cross section of the light guide 31 may form a trapezoid. The incidence plane 31a corresponds to the short side of the trapezoid and the exit plane 31b corresponds to the long side of the trapezoid.

As for a method of manufacturing the light guide 31 of this embodiment, it is preferable to adopt a resin mold process which fills up a metallic mold with the resin which has optical requisite permeability, because the light guide 31 has long shape as shown in FIG. 6A. Since it is necessary to take out the fabricated resin from the metallic mold when manufacturing by this method, it is preferable that the light guide have a form which is easy to extract from the metallic mold, which will lower manufacturing costs. The light guide 31 has no dent place on the connecting planes except for the connecting planes 31a and 31b. Dent place refers to a concave potion. Therefore, in manufacturing the light guide 31 using a metallic mold, the resin in the metallic mold can be easily taken out from the metallic mold by taking out from the exit plane 31b side of the light guide 31.

Figure 1A:
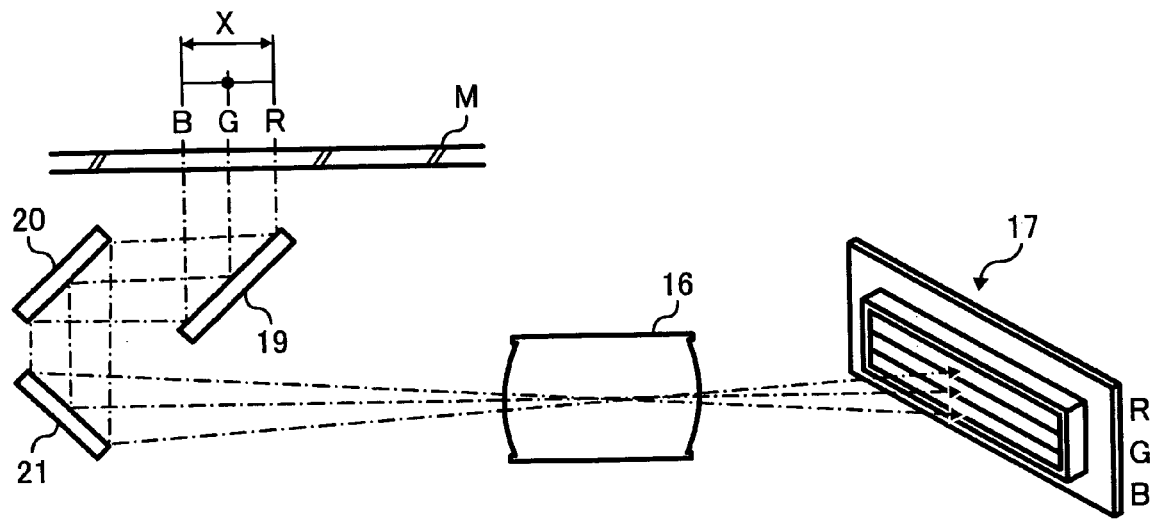
FIG. 1A is an illustration of light reflecting from a manuscript to a CCD.
Figure 1B:
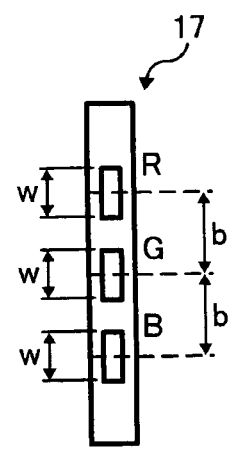
FIG. 1B is an illustration of a configuration of photo acceptance elements of the CCD.

In this embodiment as shown in FIG. 5, the LED 32 and the light guide 31 are so arranged that the direction of the light output from the exit plane 31b is about parallel with the side of the LED array board 30. The light from the exit plane 31b may spread radially because the light is output radially from the exit plane of the LED 32. In positioning the light guide 31 with respect to the LED array board 30, the certainty of the positioning increases by arranging the whole light guide 31 on the substrate side of the LED array board 30. However, if the light guide 31 is attached to the LED array board 30 so that the exit plane 31b is located on the substrate side of the LED array board 30, a part of light output from the exit plane 31b will be interrupted by the LED array board 30. Consequently, the interrupted light is not irradiated to the manuscript. Since LED 32, which has comparatively small optical intensity is adopted, it is preferable that the radial light from the exit plane 31*b* be collected on the specific part of the manuscript, for example, the width X on the manuscript as shown in FIG. 1A, if possible. Therefore, it is desirable to arrange the light guide 31 so that a part of the light which is output from the exit plane may not be interrupted by the LED array board 30. Then, in the embodiment as shown in FIG. 5, the light guide 31 is so arranged that the exit plane 31*b* is on the edge of the LED array board 30 or extends past the edge of the LED array board. Consequently, the light which is output from the exit plane 31*b* is not interrupted by the LED array board 30. As a result, all the light which is output from the exit plane 31*b* may be irradiated to the manuscript.

Furthermore, the light guide 31 has a configuration that all light from each LED 32 can enter the incidence plane 31*a*, since the incidence plane 31*a* may face each exit plane of LED 32, and be near or in contact with the exit plane of LED 32. In an exemplary embodiment with this configuration, as for the LED, it is desirable that the LED exit plane have a flat or concave shape. If the exit plane of the LED has a convex shape, it is necessary to form the light guide 31 so that the convex shaped exit plane can be covered. This increases the manufacturing costs of the light guide 31. Furthermore, if a lead of LED 32 is over the exit plane to the light guide 31, the lead may interrupt the arrangement of the light guide 31 so that the incidence plane 31*a*, that faces each exit plane of LED 32, is not near or in contact with the exit plane of LED 32. Therefore, it is desirable to arrange each lead of LED 32 so that it is in a position distant from the light guide 31, and not in a position near each exit plane of LED 32.

Figure 6B:
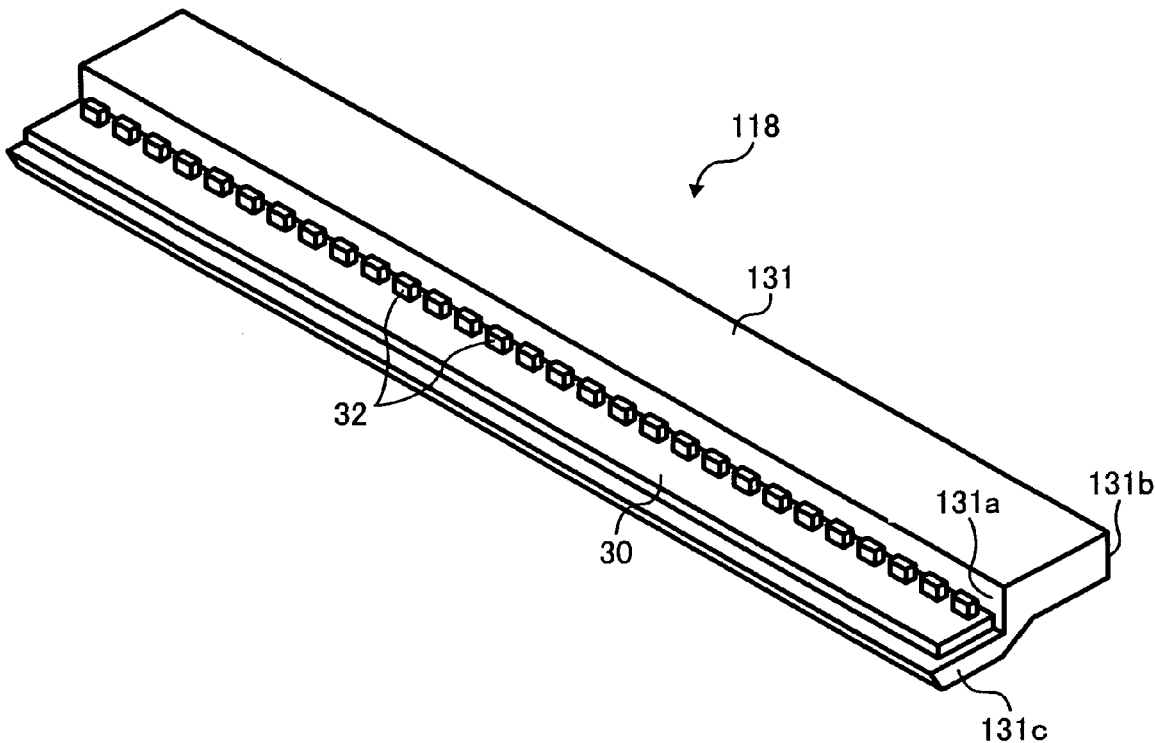
FIG. 6B is a perspective illustration of the optical irradiation unit for another exemplary embodiment.

FIG. 6B is a perspective illustration of an optical irradiation unit 118 of another embodiment of the present invention. A light guide 131 is made of one piece including an attachment part 131*c* near an incidence plane 131*a*. The incidence plane 131*a* is almost vertical to the side of the attachment part 131*c*. The LED array board 30 is attached with, for example, adhesives, double-stick tape, etc. on this attachment part 131*c*.

In the exemplary embodiment shown in FIG. 6B, the exit plane of each LED has the same position of an edge side of the LED array board 30. The edge side of the LED array board 30 touches the incidence plane 131*a*, and the LED array board 30 is fixed to the attachment part 131*c* of the light guide 131. Then, the relative position of each LED 32 and the light guide 131 on the LED array board 30 may be determined appropriately. Particularly, if the positioning accuracy of LED 32 on the LED array board 30 is high, the accuracy of the relative position between the LED 32 and the light guide 131 becomes high. Thus, positioning becomes easy because the edge side of the LED array board 30 is touched to the incidence plane 131*a*.

Figure 6C:
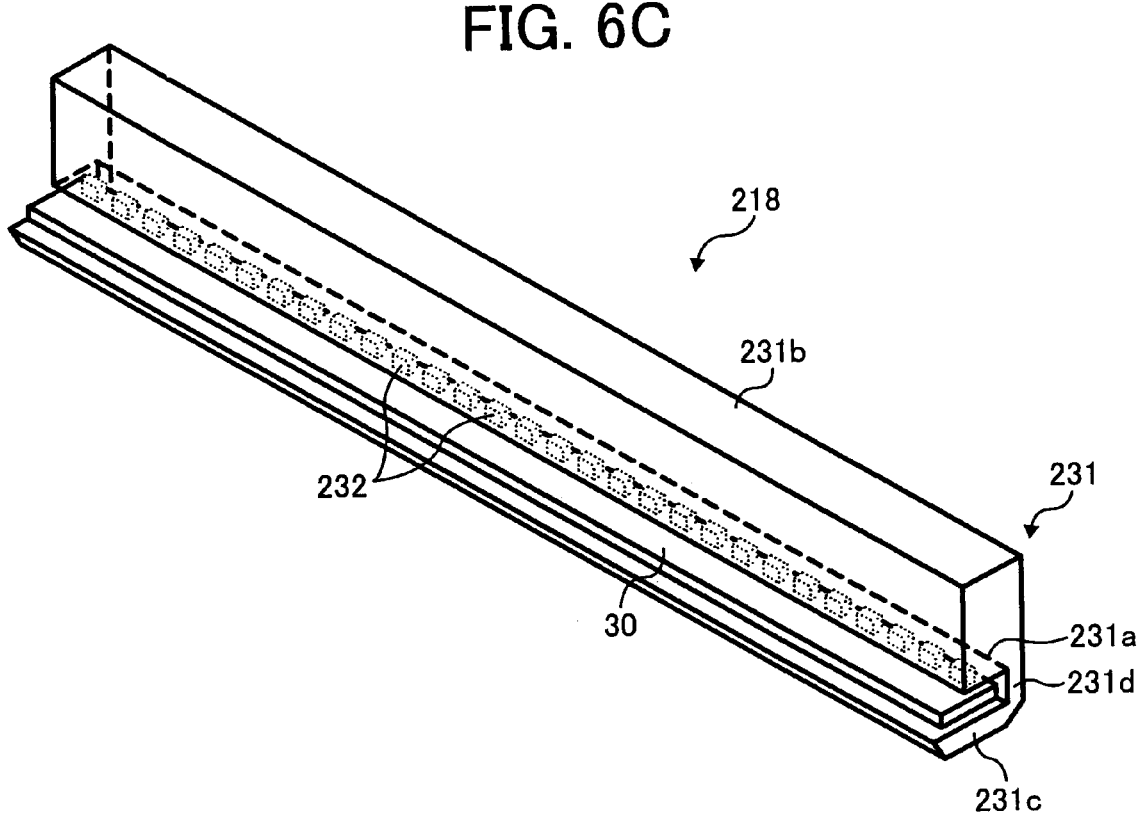
FIG. 6C is a perspective illustration of the optical irradiation unit for another exemplary embodiment.

FIG. 6C is a perspective illustration of an optical irradiation unit 218 of another exemplary embodiment of the present invention. In the optical irradiation unit 218 of this embodiment, the direction of light from an exit plane 231*b* of a light guide 231 is almost vertical to the substrate side of the LED array board 30. The light guide 231 is made in one piece and includes an attachment part 231*c* and a pinched part 231*d*. There is a certain gap between the surface of the attachment part 231*c* and an incidence plane 231*a*. The LED array board 30 is attached on the attachment part 231*c* by using, for example, adhesives, double-stick tape, etc.

In the embodiment, each LED 232 has the exit plane which is in parallel with the substrate side of the LED array board 30. The edge side of the LED array board 30 is touched to the pinched part 231*d*, and the LED array board 30 is fixed to the attachment part 231*c* of the light guide 231. Then, the exit plane of the LED 232 may face the incidence plane 231*a*, and the incidence plane 231*a* may be near to or touching the exit plane of the LED 232. Thus, the relative position of each LED 232 and the light guide 231 on the LED array board 30 may be determined appropriately. Particularly, if the positioning accuracy of LED 232 on the LED array board 30 is high, the accuracy of the relative position between the LED 232 and the light guide 231 becomes high. Thus, the positioning becomes easy because the edge side of the LED array board 30 is touched to the pinched part 231*d*.

According to this embodiment, the light from the LED 232 enters the incidence plane 231*a*. Then, the light exits from the exit plane 231*b* of the light guide 231. The output light has almost a vertical direction (i.e., perpendicular) with respect to the substrate side of the LED array board 30.

Figure 6D:
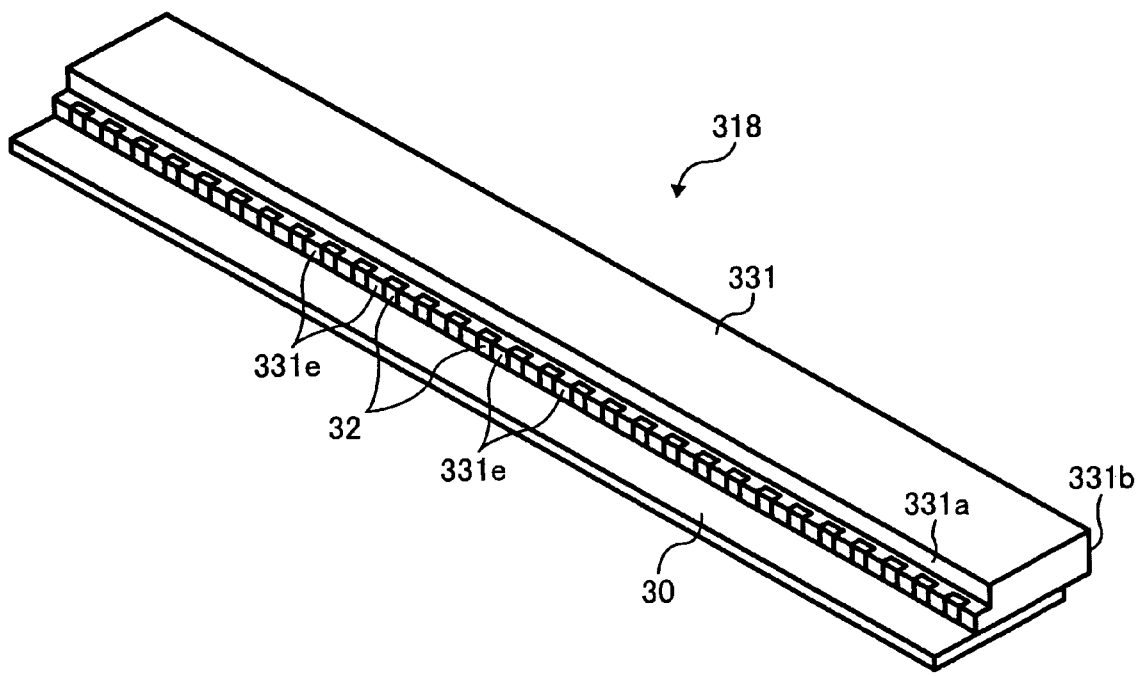
FIG. 6D is a perspective illustration of the optical irradiation unit for another exemplary embodiment.

FIG. 6D is a perspective illustration of an optical irradiation unit 318 of another exemplary embodiment of the present invention. A light guide 331 has plural projection parts 331*e* perpendicularly projected from an incidence plane 331*a*. There is a space for each LED 32 to fit in between the projection parts 331*e*. When attaching the light guide to the LED array board 30, the relative position of each LED 32 and the light guide 331 on the LED array board 30 may be positioned easily and correctly by fitting the LED 32 between the projection parts 331*e*. Although the fit space is provided corresponding to the LED 32, at least one fit space is enough for the LED 32 fitting.

Figure 2:
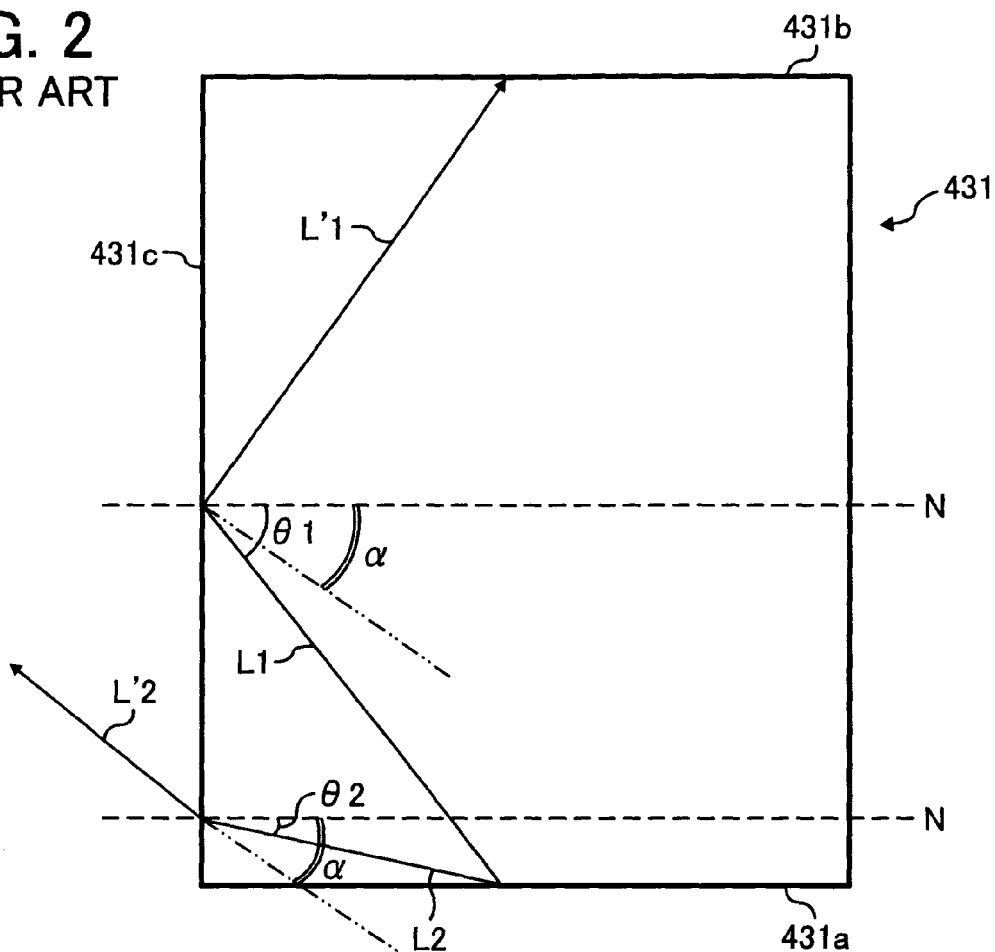
FIG. 2 is an illustration of a light path in a light guide.
Figure 3:
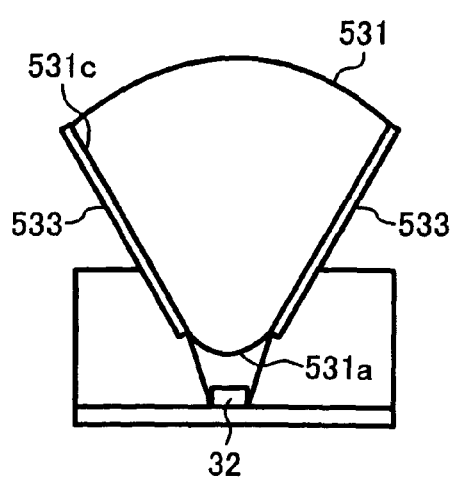
FIG. 3 is an illustration of a conventional optical irradiation apparatus.
Figure 7A:
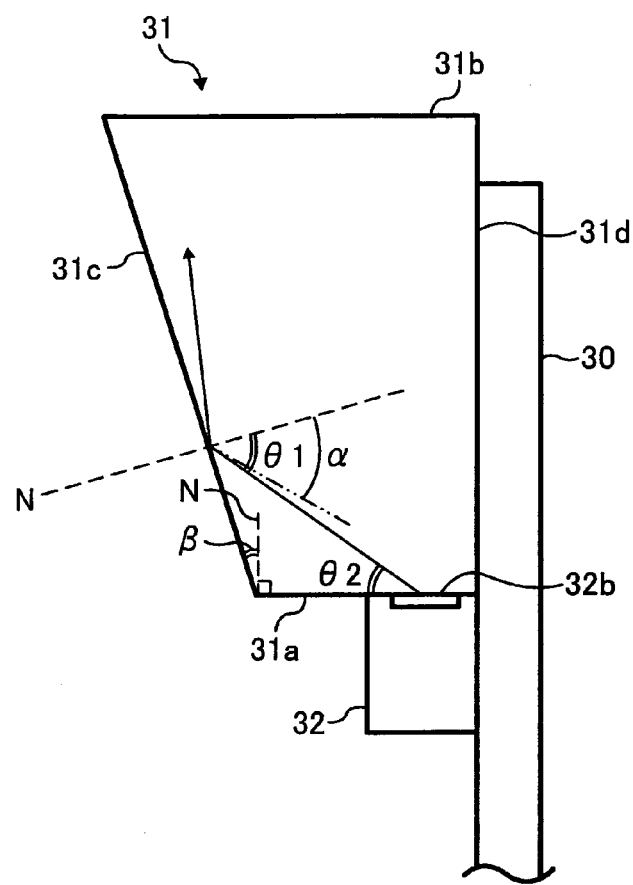
FIG. 7A is an illustration of a light path in a light guide for an exemplary embodiment.
Figure 7B:
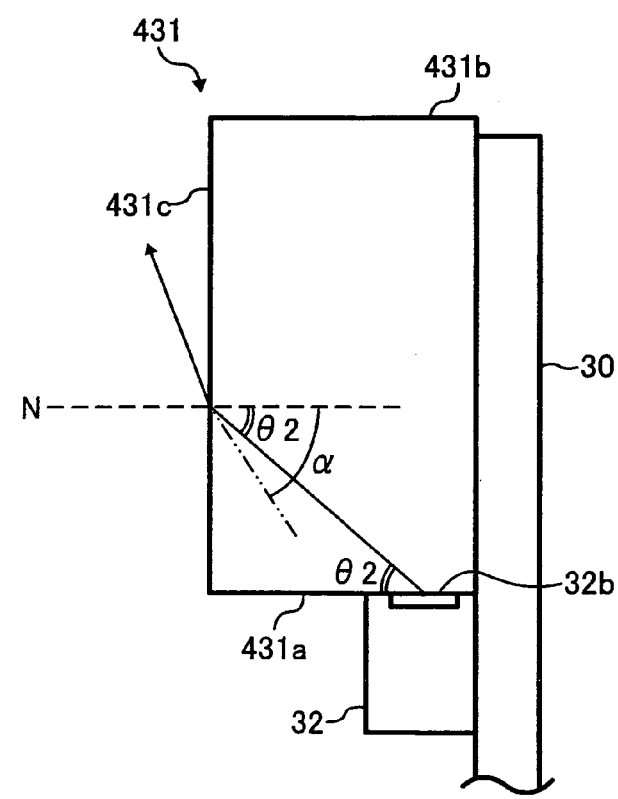
FIG. 7B is an illustration of a light path in a light guide for another exemplary embodiment.

FIG. 7A is an illustration showing a light path of the light incident on the connecting plane 31*c* of the light guide 31. FIG. 7B is an illustration showing the light path of the light passing through a light guide 431, which is constituted so that the connecting plane 431*c* of the light guide 431 may become vertical to the incidence plane 431*a*. The light guide 431 in FIG. 7B is the same as the light guide 431 in FIG. 2. As shown in FIG. 7B, the incidence light which has an angle $\theta 2$ to an incidence plane 431*a* of the light guide 431 reaches a connecting plane 431*c* with an incidence angle $\theta 2$ to the connecting plane 431*c*. Since the incidence angle $\theta 2$ is smaller than a critical angle $\alpha$ to the connecting plane 431*c*, the light incident to the connecting plane 431*c* is refracted by the connecting plane 431*c*, and penetrates the connecting plane 431*c*. Consequently, the light incident on the connecting plane 431*c* exits to the outside of the light guide 431.

On the other hand, in the light guide 31 of this embodiment, the light incident on the connecting plane 31*c*, which has an angle $\theta 2$ to the incidence plane 31*a* of the light guide 31 as shown in FIG. 7A, reaches the connecting plane 31*c* with an incidence angle $\theta 1$ to the normal line N of plane 31*c*. In this embodiment, since the plane 31*c* inclines at an angle $\beta$ to the normal line N of the incidence plane 31*a*, the incidence angle $\theta 1$ is larger than the incidence angle $\theta 2$ in the light guide 31 shown in FIG. 7A. In more detail, the incidence angle $\theta 1$ is larger than the critical angle $\alpha$ to the side 31*c*. Then, the incidence light which reaches the side 31*c* is totally reflected by the plane 31*c*. Consequently, this incidence light pass through the inside of the light guide without exiting to the outside of the light guide 31, finally reaches the exit plane 31*b* of the light guide 31, and exits from the exit plane 31*b* to the outside of the light guide.

According to this exemplary embodiment, the light guide 31 leads much more light to the exit plane 31*b* than that of the light guide 431. As a result, the optical irradiation equipment using the light guide 31 irradiates with more intense light to the target domain of the manuscript as the portion of the width X on the manuscript shown in FIG. 1A than that of the optical irradiation equipment using the light guide 431.

As shown in FIG. 7B, in a case that the connecting plane 431*c* is vertical to the incidence plane 431*a* and the light guide is made by generally used resin, the incidence light which penetrates through the connecting plane 431c is the light which is irradiated from the LED 32 having the larger angle than a half-value angle (explained below) of the light irradiated from the LED 32 and that enters the incidence plane 431a.

Figure 8:
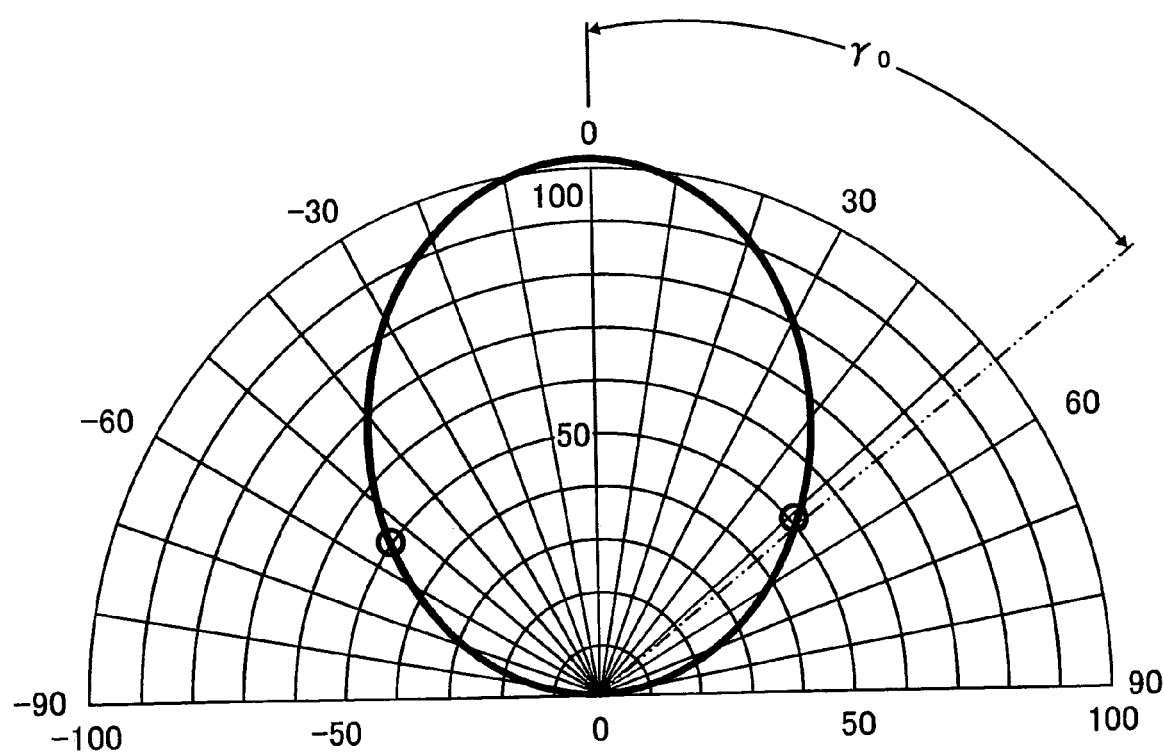
FIG. 8 is an illustration of a distribution of light exiting from an LED.

An explanation of half-value angle follows. FIG. 8 is an illustration showing light distribution of light exiting the LED 32. This light distribution shows the light level of the every point which is in equal distance from the central point of the exit plane of the LED 32. The light level is the relative value compared to the point located on the normal line from the central point as 100. In addition, the LED 32 is driven to generate the maximum light level at the point located on the normal line. If the LED 32 has the ideal light distribution, the shape of the distribution becomes a perfect circle, but the LED 32 of this embodiment forms an ellipse as shown in FIG. 8. The line which connects the central point and a point of the 50 level and the normal line make an angle $\gamma_0$. The $\gamma_0$ is called the half-value angle. As shown in FIG. 8, the half-value angle $\gamma_0$ of the light irradiated from the LED 32 in this embodiment is about 51 degrees.

In this embodiment, the connecting plane 31d of the light guide is vertical to the incidence plane 31a. Therefore, in the connecting plane 31d, the incidence light may not be led to the exit plane 31b, because the incidence light pass through the connecting plane 31d like in the light guide 431 as shown in FIG. 7B. In order to lead the incidence light to the exit plane 31b, aluminum may be evaporated to the substrate side of the LED array board 30 where the connecting plane 31d is fixed so that the substrate side may be reflective surface. In this case, the light which exits from the connecting plane 31d to the outside of the light guide is reflected in the substrate, and it may enter the light guide again through the connecting plane 31d. Then, if this light reaches the connecting plane 31c, it may totally reflect in the connecting plane 31c, and the light may be led to the exit plane 31b finally.

Figure 9:
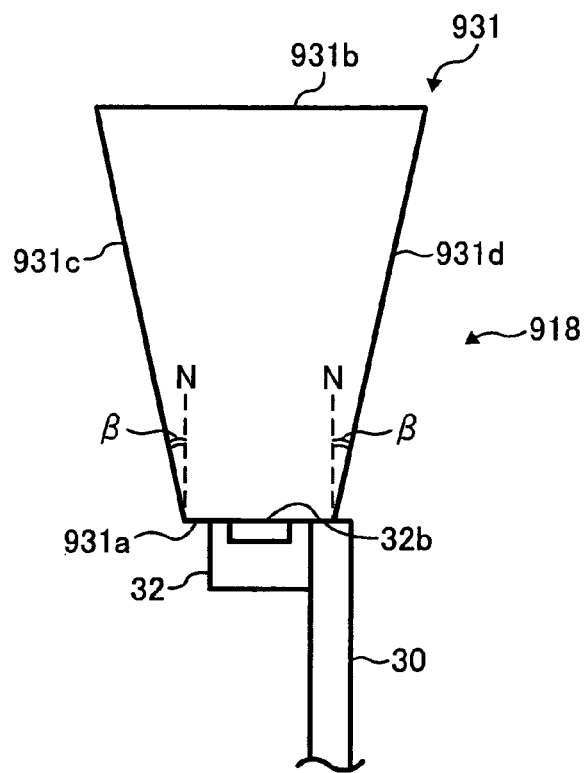
FIG. 9 is an illustration of a configuration of an optical irradiation unit for an exemplary embodiment.

Next, configuration of the optical irradiation unit of another exemplary embodiment is explained. FIG. 9 is an illustration showing a general configuration of the optical irradiation unit 918 of the embodiment. A light guide 931 has an incidence plane 931a, an exit plane 931b, a connecting plane 931c, a connecting plane 931d, etc. The connecting planes 931c and 931d incline at the angle β to the normal line N of the incidence plane 931a. Therefore, the cutting plane which cut the light guide 931 along the direction of the normal line of the incidence plane 931a so that it may pass through these two connecting planes 931c and 931d has a shape of trapezoid. The incidence plane 931a corresponds to the short side of the trapezoid and the exit plane 931b corresponds to the long side of the trapezoid.

In this embodiment as shown in FIG. 9, the LED 32 and the light guide 931 are so arranged that the direction of the light outputting from the exit plane 931b is about parallel with the side of the LED array board 30. However, in this embodiment, the two above-mentioned connecting planes 931c and 931d are plane symmetry to the specific plane (it is a parallel plane to the direction of a sequence of LED 32) which is along the direction of a normal line of the incidence plane 931a. Therefore, in the direction in which the connecting planes 931c and 931d face each other (horizontal direction in FIG. 9), the LED 32 and the light guide 931 are arranged so that the center of the exit side 32b of the LED 32 may be matched with the center of the incidence plane 931a of the light guide 931. Then, in the direction in which the connecting planes 931c and 931d face each other (horizontal direction in FIG. 9), the partial intensity of the exit light from the exit plane 931b of the light guide 931 may be prevented. The more intensive light is irradiated to the target domain of the manuscript as the portion of the width X on the manuscript shown in FIG. 1A than that of the optical irradiation equipment without the use of the plane symmetry.

Figure 10:
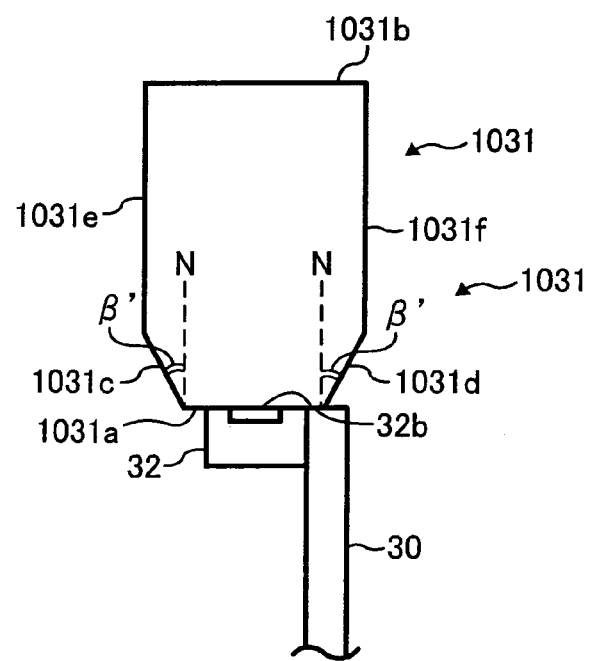
FIG. 10 is an illustration of a configuration of an optical irradiation unit for another exemplary embodiment.

Next, a configuration of an optical irradiation unit of another exemplary embodiment is explained. FIG. 10 is an illustration showing a general configuration of the optical irradiation unit 1018 of the embodiment. A light guide 1031 has an incidence plane 1031a, an exit plane 1031b, a connecting plane 1031c, a connecting plane 1031d, a connecting plane 1031e, a connecting plane 1031f, etc. The connecting planes 1031c and 1031d incline at the angle β' to the normal line N of the incidence plane 1031a. The connecting planes 1031e and 1031f are in parallel with the normal line N.

The incidence angle to the connecting plane 431c of the incidence light from the incidence plane 431a becomes large as the distance from the incidence plane 431a becomes large. Therefore, even if the connecting plane 431c is in parallel with the direction of the normal line of the incidence plane 431a as the light guide 431 shown in FIG. 7B, at the point on the connecting plane 431c which is a predetermined distance from the incidence plane 431a, the incidence light may not penetrate the point on the connecting plane 431c. That is, only a part of the connecting plane 431c near the incidence plane 431a a problem in which the incidence light exit to the outside of the light guide 431 shown in FIG. 7B. Then, in this embodiment, only the portion where this problem occurs is made to be inclined by angle β' to the normal line N of the incidence plane 1031a, and it corresponds to the connecting planes 1031c and 1031d.

In this embodiment, the boundary between the connecting planes 1031c and 1031e, and the boundary between the connecting planes 1031d and 1031f may be determined as follows. In a case that the incidence light from the incidence plane 1031a to a plane including the connecting plane 1031d or 1031f make an incidence angle to the plane, if the angle becomes a critical at the point on the plane, the boundary is determined on this point.

The light guide 1031 has no dent place on the connecting planes between the planes 1031a and 1031b. Therefore, in manufacturing the light guide 1031 using a metallic mold, the resin in the metallic mold can be easily taken out from the metallic mold by taking out from the exit plane 1031b side of the light guide 1031.

The incidence light which reaches the connecting planes 1031c, 1031d, 1031e, and 1031f is totally reflected by the connecting planes. Consequently, this incidence light passes through the inside of the light guide without exiting to the outside of the light guide 1031, finally reaches to the exit plane 1031b of the light guide 1031, and exits from the exit plane 1031b to the outside of the light guide. According to the embodiment, the light guide 1031 leads much more light to the exit plane 1031b than that of the light guide 431. As a result, the optical irradiation equipment using the light guide 1031 irradiates with more intensive light to the target domain of the manuscript as the portion of the width X on the manuscript shown in FIG. 1A than that of the optical irradiation equipment using the light guide 431. In addition, in the optical irradiation equipment of the embodiment, plural LEDs 32 and light guide are arranged so that all light from the LEDs 32 may enter the incidence plane of the light guide. In a case where the plural LEDs 32 are used as a light source, it is desirable for all light from the LEDs 32 to enter the light guide, because it is difficult to intensify the light of the LEDs. In this way, it is possible to use the light irradiated from the plural LEDs 32 without wasting. If the optical intensity of the LED 32 is large enough, a part of the light from the plural LEDs 32 may not enter the incidence plane of the light guide.

Furthermore, in the optical irradiation equipment of the embodiment, a light source may be realized with small power consumption and calorific value, because the plural LEDs 32 are used as a light source. The cost of scanner is low by using the optical irradiation equipment of the embodiment. The cost of the full color copying machine 1, which is an image forming apparatus, is also low by using the scanner.

Furthermore, the copying machine has been mentioned as the embodiment of the invention. However, this invention may also apply to an image reading device, such as a scanner, a facsimile, etc., having the same configuration as the image reading part of the copying machine.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent applications, No. JPAP2005-173453 and JPAP2005-173445 both filed on Jun. 14, 2005 in the Japan Patent Office, the entire contents of each of which are incorporated by reference herein.

The invention claimed is:

1. An optical irradiation apparatus, comprising:
a light source including an exit side configured to radially irradiate light, said light source including an arrangement of a plurality of light emitting units in at least one sequence;
a light source array board with a side intersecting with the exit side of the light source; and
a light guide including a transparent material configured to lead a light beam irradiated from the light source in a specific direction and to emit the light beam, the light guide including
an incidence surface configured to receive the light beam irradiated from the light source, said incidence surface facing the exit side of the light source,
an exit surface configured to emit the light beam so as to irradiate a manuscript on a contact glass, and
plural connecting surfaces configured to connect the incidence surface to the exit surface,
wherein a part of at least one of the plural connecting surfaces is inclined with respect to an axis of the light beam and at least a portion of a connecting surface facing the inclined connecting surface is on the light source array board.

2. The apparatus of claim 1, wherein the part of the at least one of the plural connecting surfaces is configured to receive the light beam, and an angle between the at least one of the plural connecting surfaces and the received light beam is greater than a half-value angle of the light beam from the light source.

3. The apparatus of claim 1, wherein the incidence surface of the light guide contacts the exit side of the light source so that all irradiated light from the light source enters the incidence surface.

4. An image reading apparatus, comprising:
the optical irradiation apparatus of claim 1; and
an image reading unit configured to read an image of the manuscript by receiving light reflected from the manuscript.

5. The image reading apparatus of claim 4, further comprising:
an image forming unit configured to form an image on a recording material according to image information obtained by the image reading unit.

6. The apparatus of claim 1, further comprising:
a reflective surface between the connecting surface facing the inclined connecting surface and the light source array board.

7. The apparatus of claim 1, wherein the exit surface and an edge surface of the light source array board are positioned at a same place.

8. An optical irradiation apparatus, comprising:
a light source including an exit side configured to radially irradiate light, said light source including an arrangement of a plurality of light emitting units in at least one sequence;
a light source array board with a side intersecting with the exit side of the light source; and
a light guide including a transparent material configured to lead a light beam irradiated from the light source in a specific direction and to emit the light beam, the light guide including
an incidence surface configured to receive the light beam irradiated from the light source, said incidence surface facing the exit side of the light source,
an exit surface configured to emit the light beam so as to irradiate a manuscript on a contact glass, and
plural connecting surfaces configured to connect the incidence surface to the exit surface;
wherein a part of at least one of the plural connecting surfaces is inclined with respect to a normal axis of the incidence surface and configured to reflect at least a part of the light beam.

9. The apparatus of claim 8, wherein the light beam forms an angle with respect to the part of the connecting surfaces that is greater than a half-value angle of the irradiated light from the light source.

10. The apparatus of claim 8, wherein the incidence surface of the light guide contacts the exit side of the light source so that all irradiated light from the light source enters the incidence surface.

11. An image reading apparatus, comprising:
the optical irradiation apparatus of claim 8; and
an image reading unit configured to read an image of the manuscript by receiving light reflected from the manuscript.

12. The image reading apparatus of claim 11, further comprising:
an image forming unit configured to form an image on a recording material according to image information obtained by the image reading unit.

13. The apparatus of claim 8, further comprising:
a reflective surface between the connecting surface facing the inclined connecting surface and the light source array board.

14. The apparatus of claim 8, wherein the exit surface and an edge surface of the light source array board are positioned at a same place.

15. An optical irradiation apparatus, comprising:
a light source configured to radially irradiate a light beam, said light source including a plurality of light units arranged in one or more sequences; and
a light guide including a transparent material configured to lead the light beam irradiated from the light source in a specific direction and to emit the light beam;
wherein the light source and the light guide are independently disposed on a single positioning member, and the light source is disposed such that an exit side of the light source intersects with the positioning member.

16. The apparatus of claim 15, wherein the positioning member is a board member, and the light source and the light guide are arranged so that light exiting from the light guide has an exit direction that is about parallel to the board member.

17. The apparatus of claim 15, wherein the light guide is arranged so that an exit surface of the light guide and an edge surface of the positioning member are positioned at a same place.

18. The apparatus of claim 15, wherein the light guide is arranged so that an exit surface of the light guide is positioned to extend beyond an edge surface of the positioning member.

19. The apparatus of claim 15, wherein the positioning member is a board member, and the light source and the light guide are provided on a same surface of the board member.

20. The apparatus of claim 15, wherein the incidence surface of the light guide contacts the exit side of the light source so that all light irradiated from the light source is directed toward the incidence surface.

21. An image reading apparatus, comprising:
the optical irradiation apparatus of claim 15; and
an image reading unit configured to read an image of a manuscript by receiving a light reflected from the manuscript.

22. The image reading apparatus of claim 21, further comprising:
an image forming unit configured to form an image on a recording material according to image information obtained by the image reading unit.

23. An optical irradiation apparatus, comprising:
a light source including an exit side configured to radially irradiate light;
a light source array board with a side intersecting with the exit side of the light source; and
a light guide including a transparent material configured to lead a light beam irradiated from the light source in a specific direction and to emit the light beam, the light guide including
an incidence surface configured to receive the light beam irradiated from the light source, and
an exit surface configured to emit the light beam so as to irradiate a manuscript on a contact glass,
wherein an edge and an exit side of the light source array board are disposed to contact the incidence surface.

24. The apparatus of claim 23, wherein the light source and the light guide are arranged so that a center of the exit side of the light source is matched with a center of the incidence surface.

25. The apparatus of claim 23, wherein the light guide includes plural connecting surfaces configured to connect the incidence surface to the exit surface, and the plural connecting surfaces are inclined with respect to an axis of the light beam.

26. An image reading apparatus comprising:
the optical irradiation apparatus of claim 23; and
an image reading unit configured to read an image of the manuscript by receiving light reflected from the manuscript.

27. The image reading apparatus of claim 26, further comprising:
an image forming unit configured to form an image on a recording material according to image information obtained by the image reading unit.

28. An optical irradiation apparatus, comprising:
a light source including an exit side configured to radially irradiate light, said light source including an arrangement of a plurality of light emitting units in at least one sequence;
a light source array board with a side intersecting with the exit side of the light source; and
a light guide including a transparent material configured to lead a light beam irradiated from the light source in a specific direction and to emit the light beam, the light guide including
an incidence surface configured to receive the light beam irradiated from the light source, said incidence surface facing the exit side of the light source,
an exit surface configured to emit the light beam so as to irradiate a manuscript on a contact glass,
plural connecting surfaces configured to connect the incidence surface to the exit surface,
wherein a part of at least one of the plural connecting surfaces is inclined with respect to an axis of the light beam, and
a reflective surface between the connecting surface facing the inclined connecting surface and the light source array board.

29. An image reading apparatus comprising:
the optical irradiation apparatus of claim 28; and
an image reading unit configured to read an image of the manuscript by receiving light reflected from the manuscript.

30. The image reading apparatus of claim 29, further comprising:
an image forming unit configured to form an image on a recording material according to image information obtained by the image reading unit.

* * * * *